US012609053B1

(12) United States Patent
Klute et al.

(10) Patent No.: US 12,609,053 B1
(45) Date of Patent: Apr. 21, 2026

(54) TAG HOLDER FOR GALVANIZED STEEL STRUCTURES

(71) Applicant: Klute, Inc., York, NE (US)

(72) Inventors: Jordan Klute, York, NE (US); Stacey Friesen, York, NE (US); James Wagner, York, NE (US)

(73) Assignee: Klute, Inc., York, NE (US)

( * ) Notice: Subject to any disclaimer, the term of this patent is extended or adjusted under 35 U.S.C. 154(b) by 153 days.

(21) Appl. No.: 18/392,308

(22) Filed: Dec. 21, 2023

Related U.S. Application Data

(60) Provisional application No. 63/436,239, filed on Dec. 30, 2022.

(51) Int. Cl.
*G09F 3/18* (2006.01)
*C23C 2/06* (2006.01)
*G09F 3/20* (2006.01)

(52) U.S. Cl.
CPC .................. *G09F 3/18* (2013.01); *G09F 3/20* (2013.01); *C23C 2/06* (2013.01)

(58) Field of Classification Search
CPC ..................................... G09F 3/18; G09F 3/20
USPC .......................................... 40/661.08–661.12
See application file for complete search history.

(56) References Cited

U.S. PATENT DOCUMENTS

| | | | | | |
|---|---|---|---|---|---|
| 760,381 | A * | 5/1904 | Callery et al. | G09F 3/18 | 40/777 |
| 2,083,873 | A * | 6/1937 | Sisson | G09F 3/18 | 40/124.5 |
| 2,761,229 | A * | 9/1956 | Friedly | G09F 3/00 | 283/81 |
| 5,212,899 | A * | 5/1993 | Fandreyer | G09F 3/20 | 40/661.11 |

FOREIGN PATENT DOCUMENTS

| | | | | |
|---|---|---|---|---|
| DE | 102010008248 | A1 * | 8/2011 | G09F 3/10 |
| EP | 1475167 | A2 * | 11/2004 | B21C 51/00 |
| FR | 2656140 | A1 * | 6/1991 | G09F 3/00 |
| GB | 2075464 | A * | 11/1981 | G09F 3/12 |
| WO | WO-9920142 | A1 * | 4/1999 | A45F 5/155 |

OTHER PUBLICATIONS

Steel Tracking Tags https://web.archive.org/web/20220117064241/https://www.pannier.com/applications/tags-and-labels/steel-tracking-tags-for-hot-dip-galvanizing/ (Year: 2022).*

* cited by examiner

*Primary Examiner* — Kyle R Grabowski

(74) *Attorney, Agent, or Firm* — Daniel J. Honz; Advent, LLP

(57) ABSTRACT

Systems and methods for securing an information tag to metal structures during and after the galvanization process are described that permit fluids used during galvanization to flow through and around the tag holder. A system embodiment includes, but is not limited to, a tag body defining one or more funnel structures, the funnel structure extending outwardly from the tag body to provide a welding surface for securing the tag body to the metal structure while permitting fluid flow between the tag body and the metal structure to permit fluids during galvanization of the metal structure and tag body to flow therebetween; and one or more lips extending from the tag body and forming one or more tag holding regions into which an edge of the informational tag can be inserted to hold the tag against the tag body and to prevent the tag from sliding out from the tag holder.

11 Claims, 8 Drawing Sheets

TAG HOLDER FOR GALVANIZED STEEL STRUCTURES

CROSS-REFERENCE TO RELATED APPLICATIONS

The present application claims the benefit of 35 U.S.C. § 119(e) of U.S. Provisional Application Ser. No. 63/436,239, filed Dec. 30, 2022, and titled "TAG HOLDER FOR GALVANIZED STEEL STRUCTURES." U.S. Provisional Application Ser. No. 63/436,239 is herein incorporated by reference in its entirety.

BACKGROUND

Metal materials, such as iron and steel, can react with components in the environment to produce rust. Over time, the rust can corrode the metal materials, which can weaken the metal causing structural concerns, aesthetic concerns, or the like. To mitigate or prevent rust formation, metal materials can be coated in a rust-resistant barrier material that blocks interaction between the metal and environmental components, such as water and oxygen. For example, iron and steel materials can be galvanized, or coated with zinc, to provide the materials with corrosion resistance.

SUMMARY

Systems and methods for securing an information tag to metal structures during and after the galvanization process are described that permit the tag to be supported within a tag holder while enabling fluids used during galvanization to flow through and around the tag holder. A system embodiment includes, but is not limited to, a tag body defining one or more funnel structures, the funnel structure extending outwardly from the tag body to provide a welding surface for securing the tag body to the metal structure while permitting fluid flow between the tag body and the metal structure to permit fluids during galvanization of the metal structure and tag body to flow therebetween; and one or more lips extending from the tag body and forming one or more tag holding regions into which an edge of the informational tag can be inserted to hold the tag against the tag body and to prevent the tag from sliding out from the tag holder.

In an aspect, a system embodiment includes, but is not limited to, an information tag having information specific to an individualized metal structure positioned thereon; and a tag holder configured to secure the information tag relative to the individualized metal structure, the tag holder including a tag body defining one or more funnel structures, the one or more funnel structures extending outwardly from the tag body to provide a welding surface for securing the tag body to the metal structure while permitting fluid flow between the tag body and the metal structure to permit fluids during galvanization of the metal structure and tag body to flow therebetween, one or more lips extending from the tag body and forming one or more tag holding regions into which an edge of the information tag can be inserted to hold the information tag against the tag body and to prevent the tag from sliding out from the tag holder, and one or more angled sides extending from the tag body to provide a barrier against which sides of the information tag can rest to prevent the information tag from sliding out from the tag holder.

In an aspect, a method embodiment includes, but is not limited to, securing a tag holder to an individualized metal structure, the tag holder including a tag body defining one or more funnel structures, the one or more funnel structures extending outwardly from the tag body to provide a welding surface for securing the tag body to the metal structure while permitting fluid flow between the tag body and the metal structure to permit fluids during galvanization of the metal structure and tag body to flow therebetween, one or more lips extending from the tag body and forming one or more tag holding regions into which an edge of the information tag can be inserted to hold the information tag against the tag body and to prevent the tag from sliding out from the tag holder, and one or more angled sides extending from the tag body to provide a barrier against which sides of the information tag can rest to prevent the information tag from sliding out from the tag holder; introducing an information tag to the tag holder to provide a combined tag and structure, the information tag having information specific to the individualized metal structure; and subjecting the combined tag and structure to a galvanization process to galvanize the tag holder and the individualized metal structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. In the figures, the use of the same reference numbers in different instances in the description and the figures may indicate similar or identical items.

DETAILED DESCRIPTION

Overview

Figure 1:
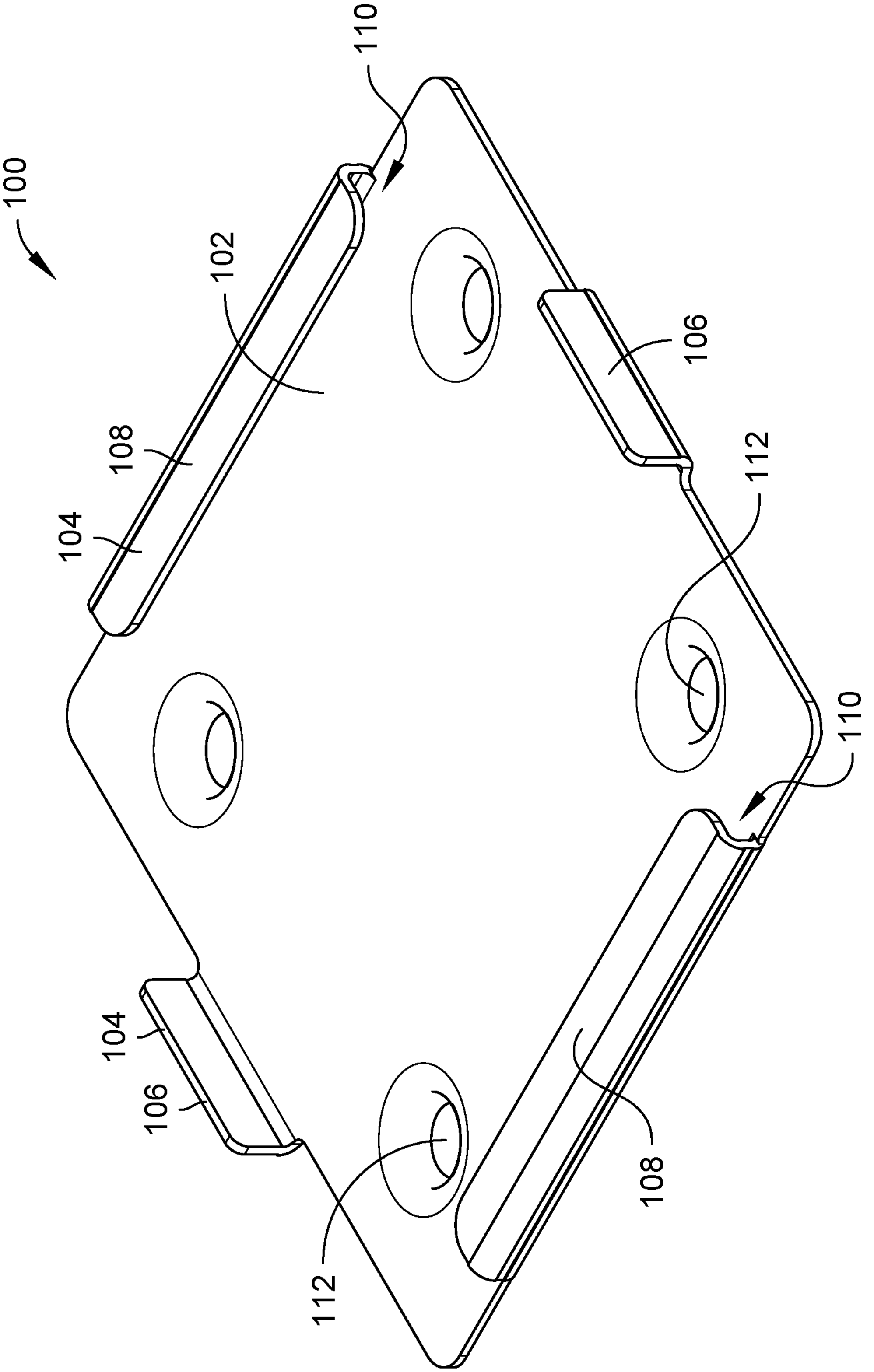
FIG. 1 is an isometric view of a tag holder for securing a tag relative to a metal structure during and after the galvanization process, in accordance with example embodiments of the present disclosure.

Metal fabricators can utilize informational tags to record various information associated with individual metal structures, such as structural steel beams, steel enclosures, electrical transmission support structures, metal platforms, and the like. The informational tags can convey information specific to individualized pieces of metal structures including, but not limited to, fabricator identifiers, part numbers, job numbers, customer information, purchase order information, structure dimensions, structure weight, design information, and so forth. The information can be used to facilitate construction of a metal structure that includes multiple structural elements, can be used to facilitate maintenance of an existing structure, can be used to facilitate orders or modifications to existing structures, and the like.

In order for an informational tag to be associated with a given metal structure, the tag can be mounted to the metal structure, such as through rivets, bolts, pins, or the like that are inserted through the tag, such as through holes formed through the tag. However, such mounting configurations provide failure points on the tag, where the tag can tear through material surrounding the hole to rip or otherwise displace the tag from the metal structure, particularly where a single mounting point is utilized (e.g., a single rivet, bolt, pin, etc.) leaving the tag hanging by the single mounting point. Such failures can occur, for example, during transport of the metal structure, during galvanization processes for the metal structure, during environmental wear and tear on the metal structure, and so forth. Galvanization of metal structures generally involves application of zinc to exterior surfaces of metal structures to provide corrosion resistance by forming a barrier between the metal and the external environment. An example galvanization process includes hot dip galvanization where a metal structure is submerged in molten zinc to coat the surfaces of the metal structure with zinc. Surfaces of the metal structures can be pre-treated prior to galvanization, such as through a degreasing process to remove surface impurities such as dirt, oil, and grease, or through an acid bath to remove surface impurities, such as metal oxides and mill scale.

However, direct mounting of the tag to the metal structure, such as through rivets, bolts, pins, or the like, can leave the surface of the metal structure covered by the tag insufficiently pre-treated or galvanized, such as when the tag interferes with the degreasing fluid, the acid cleaner, or the galvanization material. For example, the tag can physically block the molten zinc from passing the tag, preventing application of the zinc to the metal material underneath the tag. Presence of the direct-mounted tag during pre-treatment or galvanization can therefore lead to portions of the metal structure that is susceptible to rust, particularly where the direct-mount connection fails (e.g., the tag is ripped off) and the underlying surface is directly exposed to the environment.

Accordingly, the present disclosure is directed, at least in part, to systems and methods for securing an information tag to metal structures during and after the galvanization process that permit the tag to be supported within a tag holder while enabling fluids used during galvanization to flow through and around the tag holder. In an example embodiment, a tag holder includes a tag body defining a plurality of funnels defining through-holes that extend through the tag body. The funnels include structure that extends outwardly from the tag body to provide structure that offsets the tag body from a surface of a metal structure to which the tag is to be secured. In implementations, the funnels provide material to weld the tag to the surface of the metal structure while the funnels offset the tag body from the surface of the metal structure to permit fluids (e.g., acids, cleaners, molten zinc) to flow between the tag body and the surface. The tag body can define one or more venting apertures to permit fluid flow from one side of the tag body to an opposite side. The tag can also include one or more angled sides and one or more lips to hold the tag in place relative to the tag body. The sides and lips can hold the tag without including a through-hole through the tag and without a rivet, bolt, pin, or the like passing through the tag.

Example Implementations

Referring to FIGS. 1-7, aspects of tag holders for securing an information tag to metal structures during and after the galvanization process are shown in accordance with example implementations of the present disclosure. For example, FIG. 1 illustrates a tag holder 100 generally including a tag body 102 having tag retaining structures 104 configured to hold an information tag against the tag body 102. The tag retaining structures 104 include opposing angled sides 106 and opposing lips 108. In implementations, the tag retaining structures 104 are formed adjacent to a perimeter edge of the tag body 102. The lips 108 extend over the tag body 102 to define tag holding regions 110 into which an edge of the tag can be inserted to hold the tag against the tag body 102 and to prevent the tag from sliding out from the tag holder 100. The angled sides 106 provide a barrier against which sides of the tag can rest to prevent the tag from sliding out from the tag holder 100. An example of a tag 50 positioned within the tag holder 100 (e.g., with sides of the tag 50 inserted into the tag holding regions 110) is shown in FIG. 2B. While the tag holder 100 is shown with two opposing angled sides 106 and two opposing lips 108 to facilitate placement of a rectangular tag 50, the present disclosure is not limited to such configuration, where the tag holder 100 can include alternative configurations to support differently-shaped tags 50, such as rounded configurations (e.g., for circular or elliptical tags), triangular configurations, irregular configurations, or the like.

Figure 2B:
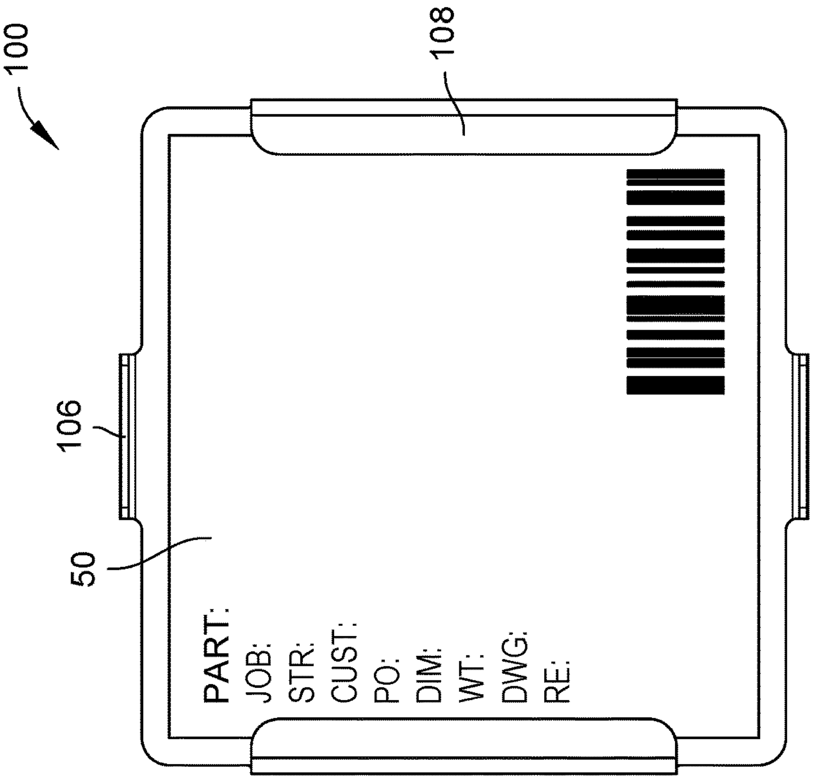
FIG. 2B is a front view of the tag holder of FIG. 2A, with a tag positioned within the tag holder, in accordance with example embodiments of the present disclosure.
Figure 2A:
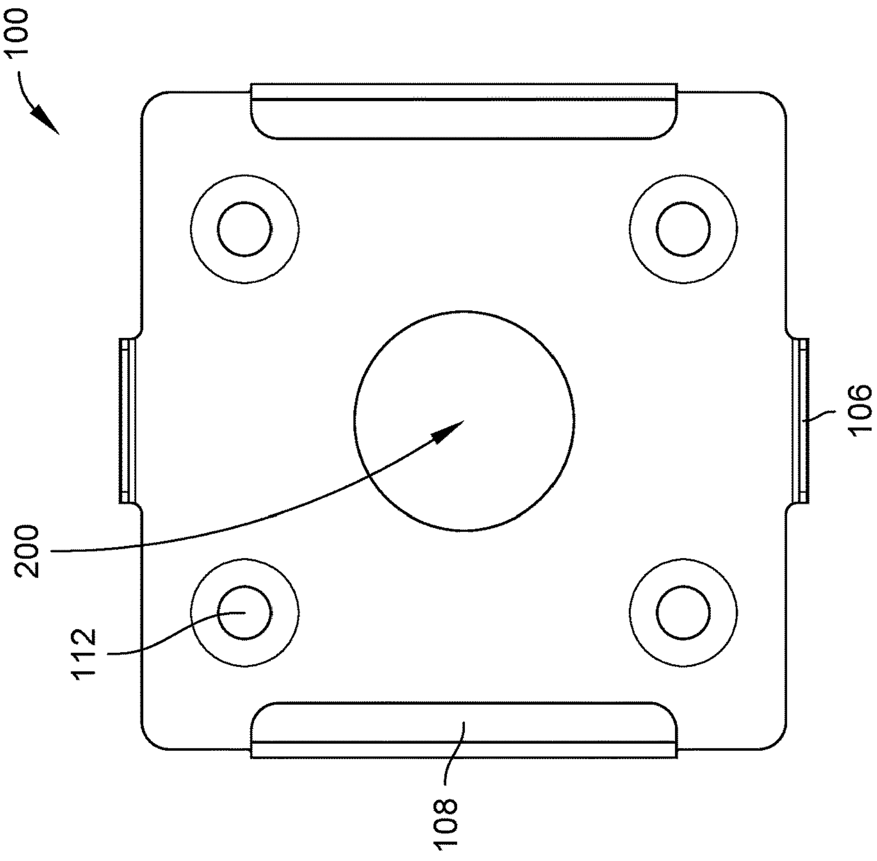
FIG. 2A is a front view of a tag holder having a vent through a body of the tag holder to permit fluid flow therethrough, in accordance with example embodiments of the present disclosure.

The tag holder 100 can define one or more apertures to facilitate securing of the tag holder 100 against a metal structure, to provide venting to permit the flow of fluids (e.g., acids, cleaners, molten zinc) to flow between the tag body 102 and the surface of the metal structure, and combinations thereof. For example, the tag holder 100 is shown in FIG. 2A including a vent 200 through the tag body 102 to permit fluid flow through the tag holder 100. The vent 200 is shown as a circular aperture in the tag body 102, however the present disclosure is not limited to such configurations, where the vent 200 can be provided as any shape. In implementations, the tag holder 100 is mounted to a metal structure prior to pre-treatment of the metal structure for galvanization, where the vent 200 facilitates flow-through of degreasers and/or acids during cleaning to allow the fluids to reach the surface of the metal structure underneath the tag body 102. In implementations, the tag holder 100 is mounted to a metal structure prior to galvanization of the metal structure, where the vent 200 facilitates the flow of molten zinc to allow the fluid to reach the surface of the metal structure underneath the tag body 102. The tag holder 100 or portions thereof, can be formed from a material that will also galvanize along with the metal structure. For example, the tag holder 100 can be formed from steel.

Figure 3A:
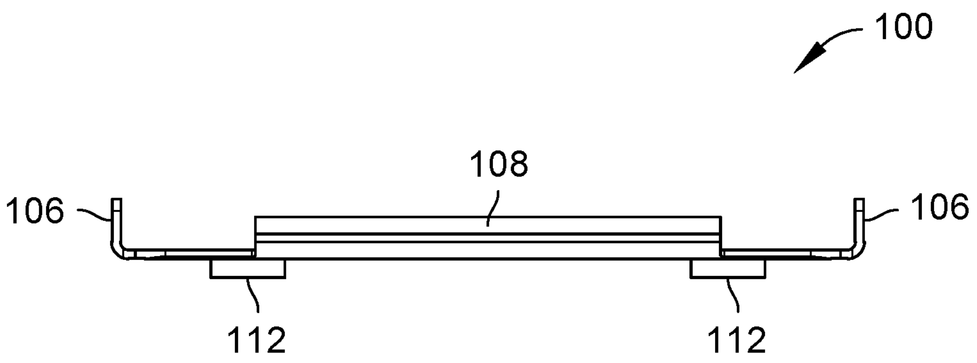
FIG. 3A is a side view of the tag holder of FIG. 2A.
Figure 3B:
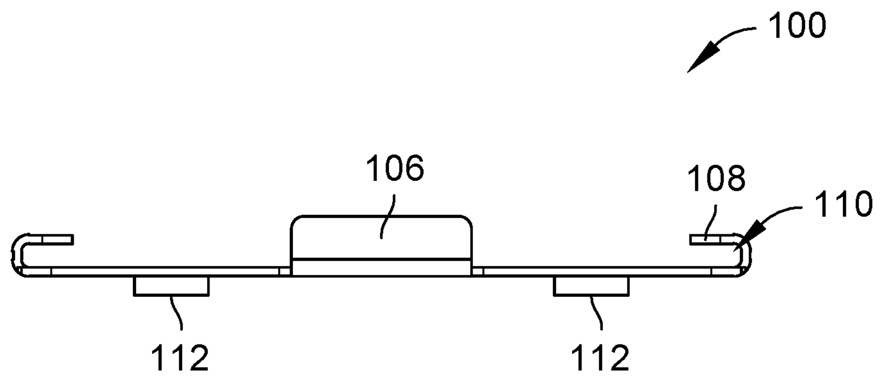
FIG. 3B is a top view of the tag holder of FIG. 2A.
Figure 4B:
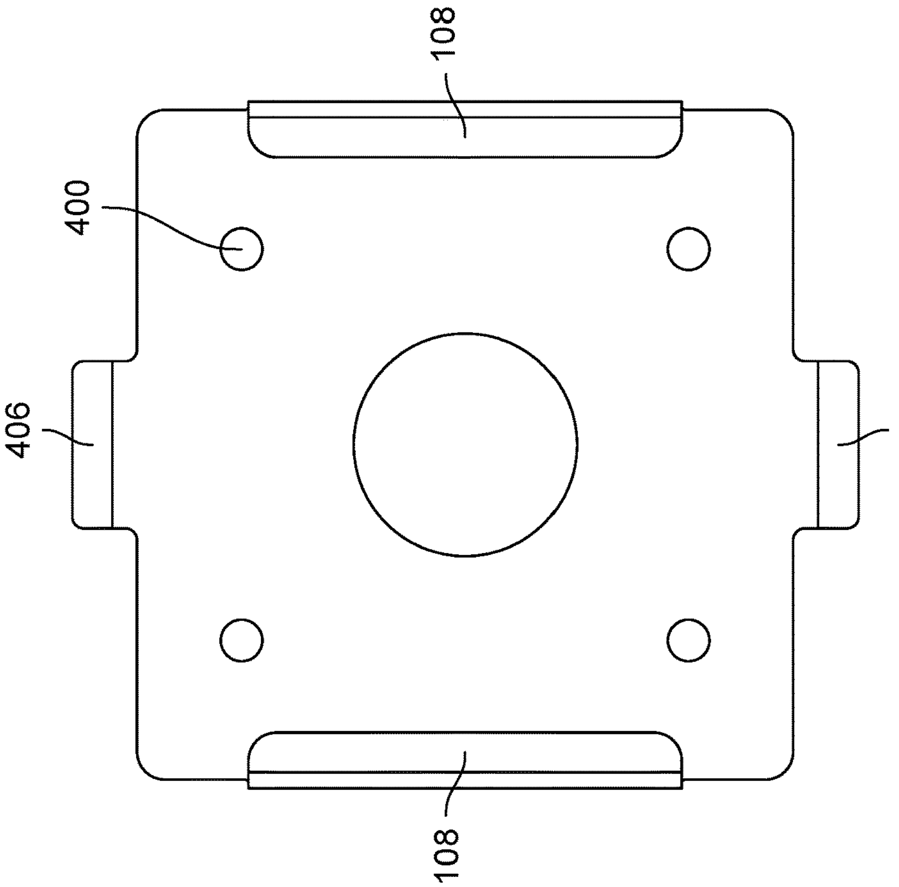
FIG. 4B is the tag holder of FIG. 4A following a second production step in accordance with example embodiments of the present disclosure.
Figure 4A:
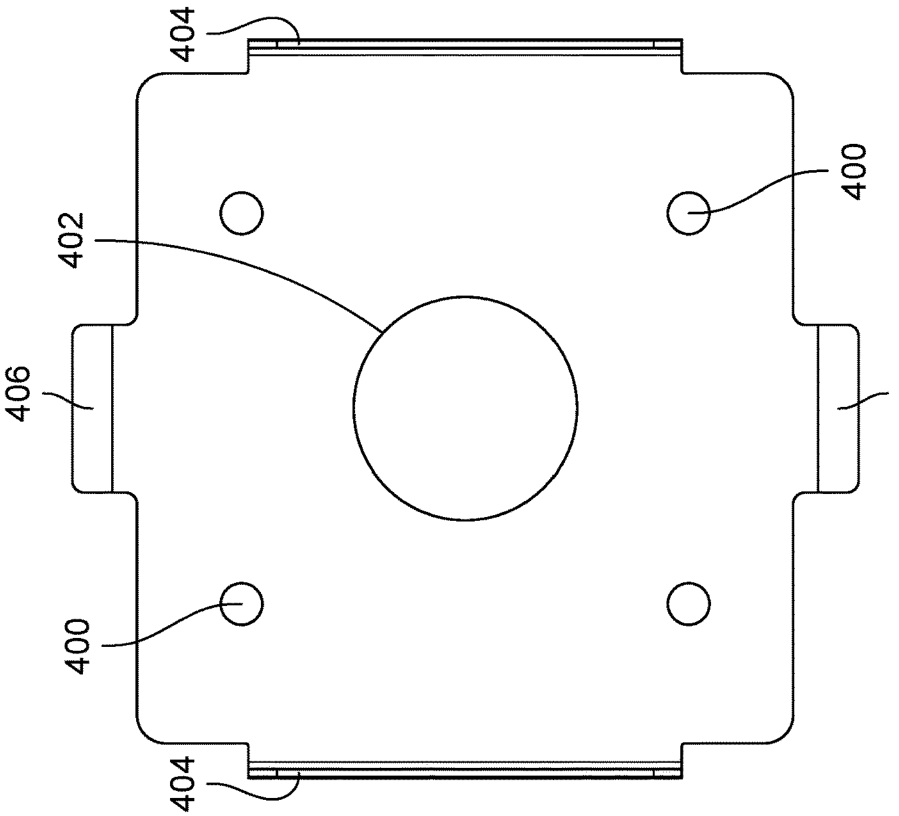
FIG. 4A is a front view of a tag holder shown following a first production step in accordance with example embodiments of the present disclosure.
Figure 4D:
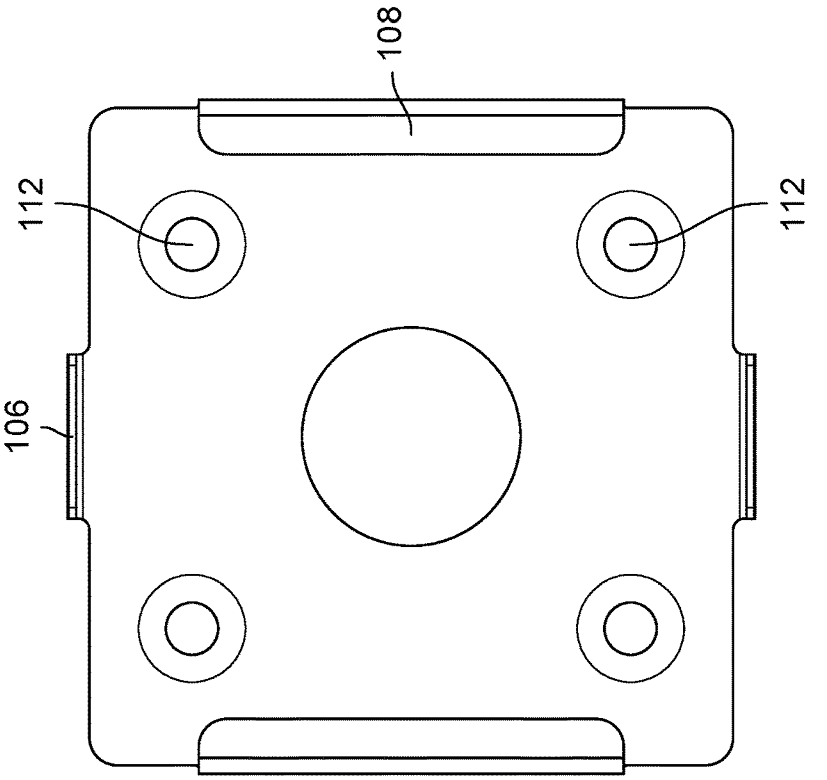
FIG. 4D is the tag holder of FIG. 4A following a fourth production step in accordance with example embodiments of the present disclosure.
Figure 4C:
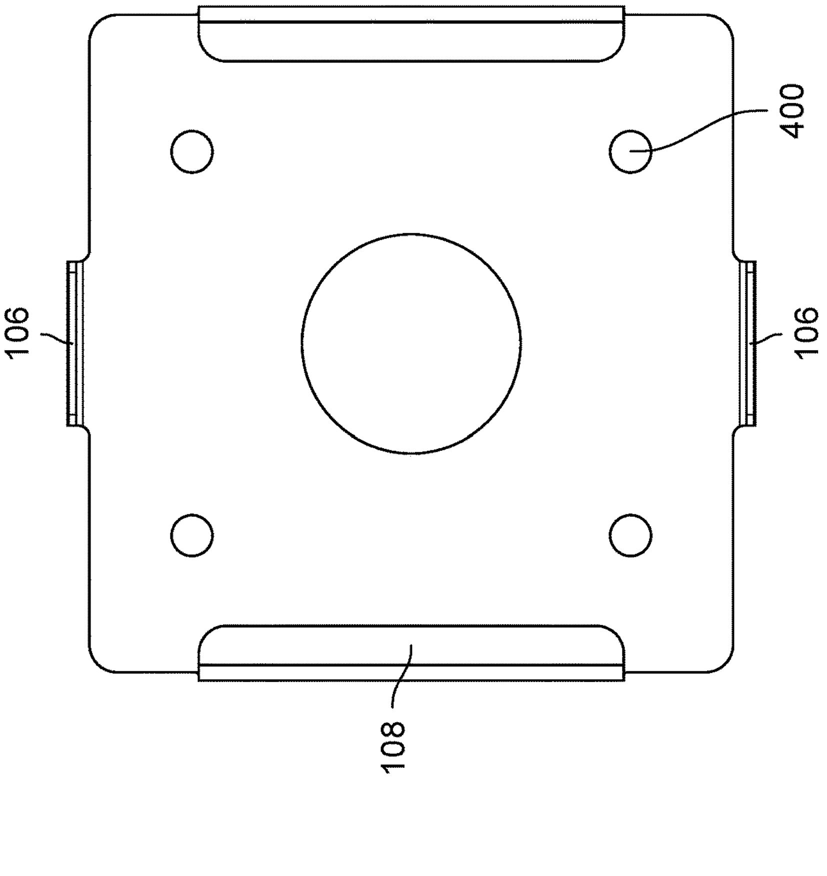
FIG. 4C is the tag holder of FIG. 4A following a third production step in accordance with example embodiments of the present disclosure.

The tag holder 100 includes one or more funnels 112 extending outwardly from the tag body 102 (e.g., as seen in FIGS. 3A and 3B) to provide structure that offsets the tag body 102 from a surface of a metal structure to which the tag 50 is to be secured. In implementations, the funnels 112 provide material to weld the tag holder 100 to the surface of the metal structure while the funnels 112 offset the tag body 102 from the surface of the metal structure to permit fluids (e.g., acids, cleaners, molten zinc) to flow between the tag body 102 and the surface. While the tag holder 100 is shown with four funnels 112 spaced apart in corners of a plane of the tag body 102, the tag holder 100 is not limited to such configurations, where the tag holder 100 can include fewer than four funnels 112, more than four funnels 112, different arrangements of the funnel(s) 112 on the tag body 102, and the like. The funnels 112 are shown defining apertures through the tag body 102. Alternatively or additionally, the tag holder 100 can include solid material extending from the tag body 102 without apertures through the tag body 102.

Figure 5:
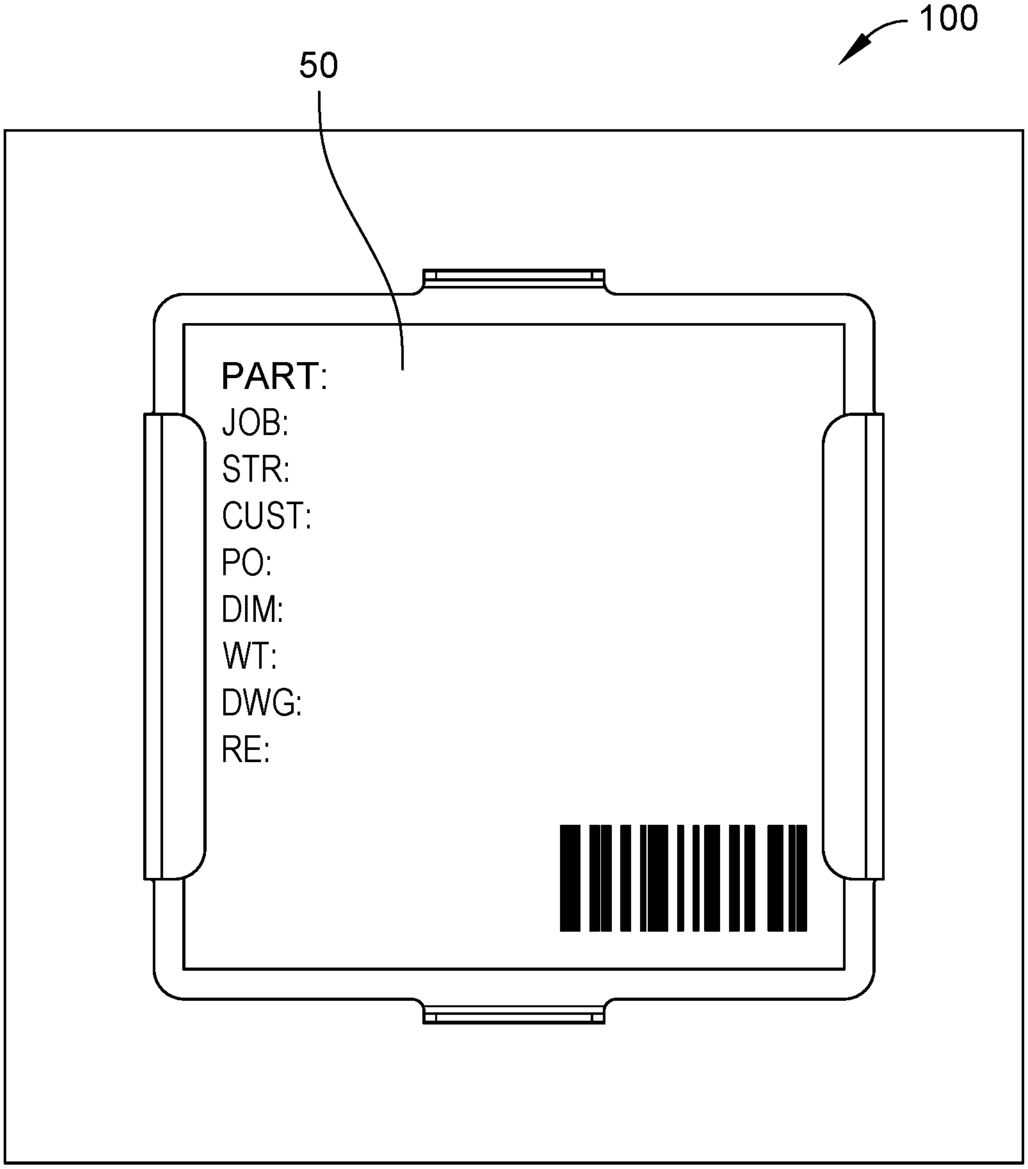
FIG. 5 is a front view of a tag holder with a tag shown secured to a galvanized metal structure in accordance with example embodiments of the present disclosure.

Referring to FIGS. 4A through 4D, the tag holder 100 is shown progressing through multiple steps of a production process. In a first step, shown in FIG. 4A, the tag body 102 is formed (e.g., through introduction of a sheet of metal through a press) to form funnel apertures 400, a vent 402, wings 404, and unfolded sides 406. The wings 404 are shown with a portion extending vertically from the tag body 102. In a second step, shown in FIG. 4B, the ends of the vertically-extending wings 404 are folded (e.g., substantially planar with the tag body 102) to form the lips 108 and corresponding tag holding regions 110. In a third step, shown in FIG. 4C, the unfolded sides 406 are folded upwards from the tag body 102 (e.g., shown in a substantially 90 degree angle from the tag body 102) to form the angled sides 106. In a fourth step, shown in FIG. 4D, the material of the tag body 102 forming the funnel apertures 400 is pushed through (e.g., in a direction opposite from the angled sides 106 and the lips 108) to form the funnels 112 and provide structure extending outwardly from the tag body 102. The structure of the funnels 112 can then be secured to a surface of a metal structure (e.g., via a welding process) and the tag 50 can be inserted into the tag holding regions 110 and between the angled sides 106 to secure the tag 50 within the tag holder 100 prior to galvanization of the combination of the metal structure and the secured tag holder 100. An example implementation of the tag holder 100 with secured tag 50 mounted to a metal structure following a galvanization process is shown in FIG. 5.

Figure 6:
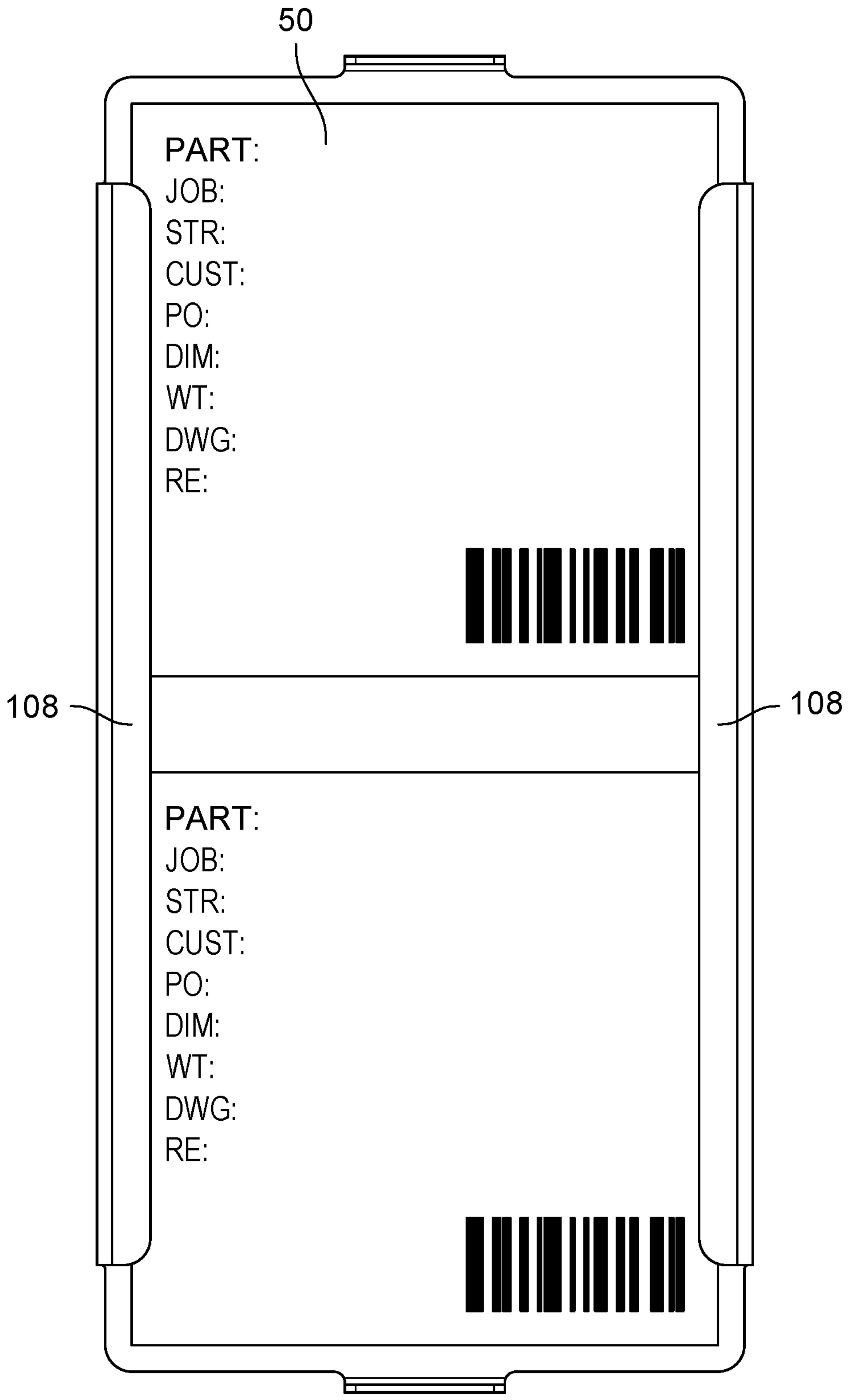
FIG. 6 is a front view of a tag holder for securing a tag relative to a metal structure during and after the galvanization process, in accordance with example embodiments of the present disclosure.
Figure 7:
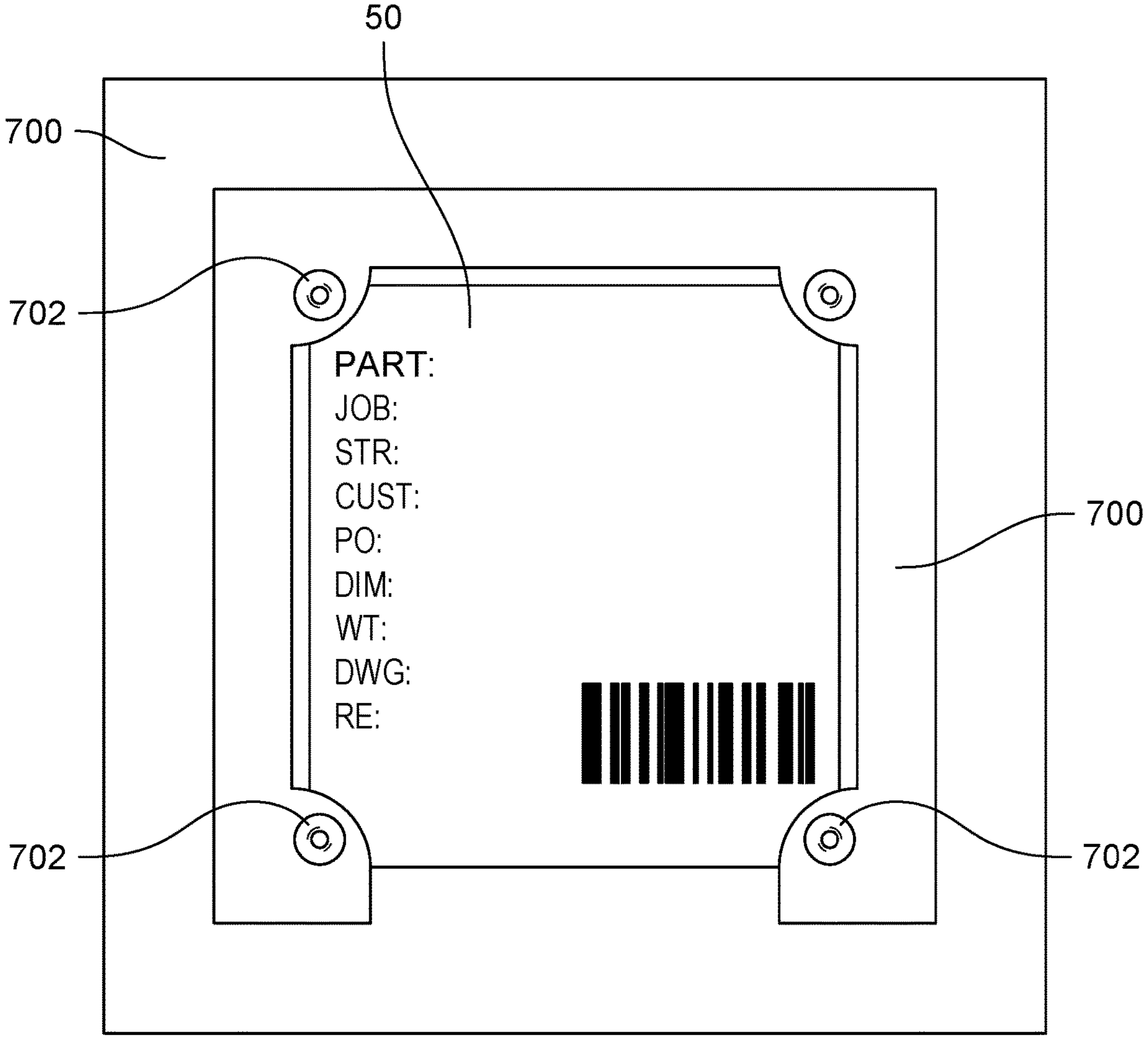
FIG. 7 is a front view of a tag holder for securing a tag relative to a metal structure during and after the galvanization process, in accordance with example embodiments of the present disclosure.

Referring to FIGS. 6 and 7, alternative structural arrangements of the tag holder 100 are shown. For instance, in FIG. 6, the tag holder 100 is shown having elongated lips 108 to support a rectangular tag 50 longitudinally, without the opposing sides 106 present. In FIG. 7, the tag holder 100 includes brackets 700 defining at least a portion of a frame to surround the tag 50, with rivets 702 used to mount the brackets 700 to the metal structure prior to galvanization.

CONCLUSION

It will be appreciated that features described herein with respect to embodiments or implementations can be combined with any other feature or features described with respect to the same or alternative embodiments, unless context otherwise dictates, without departing from the scope of the present disclosure.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A method securing an information tag to a metal structure prior to and during galvanization of the metal structure, comprising:

- securing a tag holder to an individualized metal structure, the tag holder including
  - a tag body defining one or more funnel structures, the one or more funnel structures extending outwardly from the tag body while permitting fluid flow between the tag body and the metal structure to permit fluids during galvanization of the metal structure and tag body to flow therebetween,
  - one or more lips extending from the tag body and forming one or more tag holding regions into which an edge of the information tag can be inserted to hold the information tag against the tag body and to prevent the tag from sliding out from the tag holder, and
  - one or more angled sides extending from the tag body to provide a barrier against which sides of the information tag can rest to prevent the information tag from sliding out from the tag holder;
- introducing an information tag to the tag holder to provide a combined tag and structure, the information tag having information specific to the individualized metal structure; and
- subjecting the combined tag and structure to a galvanization process to galvanize the tag holder and the individualized metal structure.

2. The method of claim 1, wherein each of the one or more angled sides and the one or more lips are positioned adjacent a perimeter edge of the tag body.

3. The method of claim 1, further comprising at least one vent aperture defined through the tag body to permit flow of fluids through the tag holder.

4. The method of claim 1, wherein the one or more lips include at least a first lip extending from a first side of the tag body and an opposing second lip extending from the first side at a distal position from the first lip.

5. The method of claim 4, wherein the one or more angled sides include a first angled side extending from the tag body and an opposing second angled side extending from the body at a distal position from the first angled side.

6. The method of claim 5, wherein each of the first lip, the second lip, the first angled side, and the second angled side is positioned adjacent a perimeter edge of the tag body.

7. The method of claim 6, further comprising at least one vent aperture defined through the tag body to permit flow of fluids through the tag holder.

8. The method of claim 1, wherein the one or more funnel structures include a plurality of funnel structures extending outwardly from the tag body in a same orientation.

9. The method of claim 8, wherein at least one of the funnel structures defines an aperture formed through the tag body.

10. The method of claim 1, wherein securing the tag holder to the individualized metal structure includes welding the tag holder to the individualized metal structure.

11. The method of claim 10, wherein welding the tag holder to the individualized metal structure includes welding a portion of the one or more funnel structures to the individualized metal structure.

* * * * *